(12) United States Patent
Bargh et al.

(10) Patent No.: US 11,504,671 B2
(45) Date of Patent: Nov. 22, 2022

(54) AUTOMATED MODULAR FILTRATION SYSTEM

(71) Applicant: THE AUTOMATION PARTNERSHIP (CAMBRIDGE) LIMITED, Royston (GB)

(72) Inventors: Neil Bargh, Royston (GB); James Pilgrim, Cambridge (GB); Richard Wales, St. Neots (GB); Martin Leuthold, Goettingen (DE)

(73) Assignee: THE AUTOMATION PARTNERSHIP (CAMBRIDGE) LIMITED, Hertfordshire (GB)

( * ) Notice: Subject to any disclaimer, the term of this patent is extended or adjusted under 35 U.S.C. 154(b) by 64 days.

(21) Appl. No.: 16/480,436

(22) PCT Filed: Jan. 24, 2018

(86) PCT No.: PCT/EP2018/051743
§ 371 (c)(1),
(2) Date: Jul. 24, 2019

(87) PCT Pub. No.: WO2018/138160
PCT Pub. Date: Aug. 2, 2018

(65) Prior Publication Data
US 2019/0381459 A1  Dec. 19, 2019

(30) Foreign Application Priority Data

Jan. 25, 2017 (EP) .................................... 17153060

(51) Int. Cl.
*B01D 61/22* (2006.01)
*B01D 61/18* (2006.01)
*B01D 65/02* (2006.01)

(52) U.S. Cl.
CPC ............. *B01D 61/22* (2013.01); *B01D 61/18* (2013.01); *B01D 65/027* (2013.01);
(Continued)

(58) Field of Classification Search
CPC ...... B01D 61/22; B01D 61/18; B01D 65/027; B01D 2311/246; B01D 2313/105;
(Continued)

(56) References Cited

U.S. PATENT DOCUMENTS 7,364,653 B1  4/2008  Slegers
3,007,568 A1  8/2011  Dileo et al.
(Continued)

FOREIGN PATENT DOCUMENTS

CN  101073730 A  11/2007
CN  101076347 A  11/2007
(Continued)

OTHER PUBLICATIONS

PCT International Search Report and Written Opinion dated Apr. 13, 2018 in corresponding Application No. PCT/EP2018/051743, 12 pages.

*Primary Examiner* — Pranav N Patel
(74) *Attorney, Agent, or Firm* — Dilworth IP, LLC (57) ABSTRACT

An automated modular filtration system, particularly for low volume tangential flow filtration processes, comprises a plurality of filtration modules formed as separate assemblies and at least one control unit for jointly controlling filtration processes of individual filtration units. Each filtration module contains at least one individual filtration unit for executing a filtration process independent of the other filtration units, first input ports for receiving a first type of fluids, second input ports for receiving a second type of fluids, and exit ports for outputting unused system fluids. First type fluids are process fluids are specific to the filtration pro-
(Continued)

cesses executed in individual filtration units. Second type fluids are system fluids not specific to filtration processes executed in the individual filtration units. The second input and exit ports establish inter-module connections so system fluids can be forwarded from one filtration module to an adjacent filtration module of the filtration system.

14 Claims, 9 Drawing Sheets

(52) U.S. Cl.
CPC .. *B01D 2311/246* (2013.01); *B01D 2313/105* (2013.01); *B01D 2313/125* (2013.01); *B01D 2313/44* (2013.01); *B01D 2313/48* (2013.01); *B01D 2313/50* (2013.01); *B01D 2313/54* (2013.01); *B01D 2313/56* (2013.01); *B01D 2313/58* (2013.01); *B01D 2315/10* (2013.01); *B01D 2315/16* (2013.01); *B01D 2317/022* (2013.01); *B01D 2317/08* (2013.01); *B01D 2321/02* (2013.01); *B01D 2321/164* (2013.01); *B01D 2321/40* (2013.01)

(58) Field of Classification Search
CPC .......... B01D 2313/125; B01D 2313/44; B01D 2313/48; B01D 2313/50; B01D 2313/54; B01D 2313/56; B01D 2313/58; B01D 2315/10; B01D 2315/16; B01D 2317/022; B01D 2317/08; B01D 2321/02; B01D 2321/164; B01D 2321/40; B01D 2311/24; B01D 2321/16; B01D 65/00; B01D 65/02; B01D 61/08; B01D 2317/04; B01D 61/10; B01D 61/20; B01D 2313/20; B01D 35/303; B01D 61/12; B01D 2313/06; B01D 2319/04; B01D 61/368; B01D 25/26; C02F 2201/006; C02F 2201/007; C02F 9/005; C02F 2201/008

See application file for complete search history.

(56) References Cited

U.S. PATENT DOCUMENTS

| | | | |
|---|---|---|---|
| 8,317,992 B2 * | 11/2012 | Sparrow | B01J 47/12 |
| | | | 204/633 |
| 9,045,725 B2 | 6/2015 | Vogel et al. | |
| 9,903,529 B2 | 2/2018 | Ajam et al. | |
| 9,943,789 B2 | 4/2018 | Puglia et al. | |
| 10,052,590 B2 | 8/2018 | Nishio et al. | |
| 10,589,194 B2 | 3/2020 | Krumbein | |
| 2003/0116487 A1 | 6/2003 | Petersen | |
| 2005/0023194 A1 | 2/2005 | Petersen et al. | |
| 2007/0240492 A1 | 10/2007 | Dileo et al. | |
| 2008/0269468 A1 * | 10/2008 | Vogel | C07K 1/34 |
| | | | 530/414 |
| 2011/0056894 A1 | 3/2011 | Scheu | |
| 2011/0094310 A1 | 4/2011 | DiLeo et al. | |
| 2014/0238922 A1 * | 8/2014 | Puglia | B01D 29/07 |
| | | | 210/236 |
| 2014/0246383 A1 | 9/2014 | Puglia et al. | |
| 2015/0300557 A1 | 10/2015 | Ajam et al. | |
| 2016/0144320 A1 | 5/2016 | Nishio et al. | |
| 2016/0289110 A1 * | 10/2016 | Oh | C02F 1/008 |
| 2017/0266590 A1 | 9/2017 | Krumbein | |

FOREIGN PATENT DOCUMENTS

| | | |
|---|---|---|
| CN | 102008895 A | 4/2011 |
| CN | 103857452 A | 6/2014 |
| CN | 103998117 A | 8/2014 |
| CN | 204251391 U | 4/2015 |
| CN | 204952678 U | 1/2016 |
| CN | 105339075 A | 2/2016 |
| WO | 03106003 A1 | 12/2003 |
| WO | 2015175679 A2 | 11/2015 |
| WO | 2016042062 A1 | 3/2016 |

* cited by examiner

AUTOMATED MODULAR FILTRATION SYSTEM

The invention relates to an automated modular filtration system, in particular for low volume tangential flow filtration processes.

BACKGROUND OF THE INVENTION

In the field of biopharmaceutical manufacturing ultrafiltration (UF) and diafiltration (DF) are commonly used as downstream processing steps for product concentration and/or buffer exchange. The basis of both UF and DF processing is filtration with a membrane that retains product and allows non-target molecules (e.g. water, salts, residuals, etc.) to flow through the membrane to waste. UF is most commonly used for concentrating a dilute product stream, while DF is most often used to exchange a product into a desired buffer (e.g. from an elution buffer into a final formulation buffer).

During UF, molecules in solution are separated based on size using membranes (filters) of a selected pore size. According to the concept of tangential flow filtration (TFF) the feed stream flows parallel to the membrane surface and is continuously re-circulated across the membranes with the primary objective of removing excess water and buffer from the feed stream. The target molecules flowing parallel to the membrane exit as retained product ("Retentate"), while unwanted molecules (e.g. water or buffer components) due to the transmembrane pressure (TMP) acting as the driving force pass through the membrane as waste ("Permeate").

The basic setup for DF is similar to the basic setup for UF. DF is generally used to change the chemical properties of the retained solution under constant volume. Unwanted particles pass through the membrane while the make-up of the feed stream is changed to a more desirable state through the addition of a replacement solution. Therefore, DF buffer is fed to the retentate vessel at the same rate that permeate is leaving the system (unlike UF processes, where there is no buffer being added to the system, or DF buffer is added before or after at least one concentration (UF) phase).

For most UF/DF processes, a series of defined steps are performed, including sanitization and pre-use testing, calibration, concentration, diafiltration, product recovery (harvest), cleaning and post-use testing, and storage.

Cleaning or sanitization of a membrane, which is usually held in a filter cassette, is necessary when a reusable membrane is employed. Sanitization is also optional without reuse of membranes in order to reduce contamination or lower bioburden. A sanitizing solution, compatible with the membrane materials of construction, is re-circulated through the membrane for a defined contact time in order to remove any microbial contamination from the system prior to contact with the product. After that, a water flux test is performed. The membrane and system are flushed with water, and the normalised water permeability (NWP) of the membrane is measured prior to the initial use to obtain flux and pressure baselines. If a membrane was not cleaned appropriately so that the pores were partially clogged, or if the membrane was damaged during storage or sanitation, the measured NWP value would significantly deviate from an initial NWP value of the membrane. The filter cassette including the membrane is "calibrated" in an integrity test using a buffer solution that is appropriate for the product, or water, before the product itself is introduced into the system and ultrafiltration and diafiltration are performed as previously described.

The concentrated and diafiltered product is then recovered from the system. A flush of the system, including the membranes, using diafiltration buffer may also be performed to recover any residual product held up by the membranes and by the UF/DF equipment. As indicated before, UF and DF membranes are typically reused for multiple product batches (i.e., cycles) due to cost reasons. Therefore, post-use membrane cleaning and testing to evaluate the cleaning effectiveness is important to ensure the membranes are acceptable for continued use. Often, the same procedure and solutions that are used for the pre-use sanitization step are also used for the post-use cleaning step.

After each processing batch the NWP of the membranes is measured again, following the post-use membrane cleaning step. By comparing the post-use NWP value to the previous and/or initial NWP value(s) it is determined how effectively the membranes were cleaned. The NWP usually decreases with repeated use of the membranes which may become detrimental to the course of the following experiment. If another processing batch does not immediately follow, the membranes are stored in a solution that will prevent the membranes from drying out and being microbially contaminated during the storage period.

With regard to the design of biological manufacturing processes, a key problem faced in the development of biological products is that small changes in the amino acid sequence in a protein biological product may have large unpredictable impacts on the behaviour of the protein in the late stages of UF/DF downstream processing in which the protein is concentrated and transferred to the formulation buffer. There is significant interest in the biomanufacturing industry in screening proteins for robustness and behaviours in UF/DF processes at earlier stages of development (in which typically only low amounts of the biological product is available), screening buffers for protective and detrimental effects on proteins during UF/DF processes earlier in development, and identifying process parameters that impact on or protect proteins during UF/DF. These desires lead to the need for systems capable of running multiple experiments to screen proteins, buffers and operating conditions. Another aspect in the development of biological products is that at different points in the development process or under different experimental strategies the number of individual TFF units ("channels") required at the same time varies.

Although multiple TFF systems are available in the market, they are inappropriately designed for the aforementioned needs. In a first format they comprise single channel, bench top, manually operated units. The problem with such systems is that the manual nature of such systems and the large recirculation volumes create an unsustainable demand for resources (labour, test sample(s), etc.). In a second format TFF systems are complex automated systems executing experiments in sequence. The critical issue arising is that the filter used is modified by the previous experiment. As such the results of a subsequent experiment are affected by the impact of the first experiment and therefore do not provide an appropriate data set for comparison. This is further constrained by the facts that a) a typically range for the number of experiments desired at the same time is between 4 and 16, and b) the nature of the samples under test, being in many cases the first time such proteins and experimental conditions have been tested in the process, means that adverse events such as increasing viscosity, aggregation and precipitation lead to a very high risk of the filter being compromised in any trial.

It is the object of the invention to overcome the above problems and to provide a reliable and flexible filtration system that allows various setups for preferably related experiments running independently at the same time.

SUMMARY OF THE INVENTION

This object is achieved by an automated modular filtration system according to claim 1. Advantageous and expedient embodiments of the invention are apparent from the dependent claims.

The invention provides an automated modular filtration system, in particular for low volume tangential flow filtration processes. The filtration system according to the invention comprises a plurality of filtration modules formed as separate assemblies. Each filtration module contains at least one individual filtration unit being designed for executing a filtration process independent of the other filtration units of the filtration system. Each filtration module includes first input ports for receiving a first type of fluids. The fluids of the first type are so-called process fluids which are specific to the respective filtration processes executed in the individual filtration units. Each filtration module includes second input ports for receiving a second type of fluids. The fluids of the second type are so-called system fluids which are not specific to the respective filtration processes executed in the individual filtration units. Each filtration module includes exit ports for outputting unused system fluids. The second input and exit ports are designed for establishing inter-module connections so that the system fluids can be forwarded from one filtration module to an adjacent filtration module of the filtration system. The modular filtration system further comprises at least one control unit designed for jointly controlling the filtration processes executed in the individual filtration units.

The term "inter-module connections" is to be understood either as direct port-to-port connections between two adjacent filtration modules, or as connections including continuous tubing between the exit ports of one filtration module and the input ports of another filtration module of the filtration system.

The advantages and benefits of the filtration system according to the invention can be summarised as follows: The filtration modules carrying the individual filtration units can be assembled into a filtration system in which multiple experiments can be run in parallel. Once assembled, the array of modules is controlled by a single control unit enabling centralised and co-ordinated control of each experiment for ease of operation. The modular nature of the filtration system allows for the effective reconfiguration of the overall system size to meet with the requirements of different development stages and strategies. The parallel nature of the system allows for the comparison of experiments at the same time avoiding degradation of data significance due to time based effects such as the maturation of a test sample. The parallel nature of the system further allows for simpler programming and setup, reducing the technical, programming and conceptual challenges for the user. Moreover, the parallel nature of the system allows for overall reduced duration of experimental programmes.

While the main applications of the modular filtration system according to the invention considered are UF/DF screening and process development, other possible areas of application include similar parallel systems for downstream process unit operations or combinations of unit operations.

According to an advantageous aspect of the invention, the modular filtration system according to the invention features a distributed control architecture where each individual functional filtration unit incorporates a dedicated local unit controller, distinct from the control unit.

In order to ensure a proper supply of system fluids to each filtration unit, the lines leading from the second input ports to the exit ports within the filtration modules branch off to the individual filtration units.

While the system fluids can be passed from one filtration module directly to an adjacent filtration module, a first filtration module of the array should be directly connected to reservoirs containing the required system fluids. In particular, the second input ports of the first filtration module of the filtration system are connected to the system fluid reservoirs.

The system fluid reservoirs preferably include at least one of the following: a cleaning fluid reservoir, especially for NaOH, a buffer solution reservoir for calibration, a fluid reservoir for water, a storage solution reservoir with the storage solution being used to maintain the physical and chemical integrity of the system during periods of non-use. Such reservoirs are flexible in their application for the before-mentioned or other fluids. For example, in order to avoid excessive workload on the operator arising from the parallel nature of the filtration system with respect to cleaning between runs, the filtration system allows for an automated cleaning cycle using a single source volume of cleaning reagents which are delivered to the first filtration module and forwarded to any further filtration modules of the array.

For an efficient experimental setup it is advantageous to connect at least one process fluid reservoir to input lines of several filtration units. This means that if at least one process fluid is required for several experiments in the filtration system, a corresponding process fluid reservoir can be shared between the respective filtration units. It is not necessary to provide several reservoirs of the same process fluid.

Preferably, the shared process fluid reservoir is a reservoir containing a protein solution or a buffer solution.

Additionally, the automated modular filtration system is designed such that process fluids and/or system fluids may remain connected to the system for multiple runs of experiments.

According to an aspect of the invention, a required starting liquid volume in the system fluid reservoirs and/or the process fluid reservoirs is calculated based on a chosen experiment design prior to the start of an experiment. The liquid volume remaining in the reservoirs can be calculated by subtracting the volumes used from the starting liquid volumes in the reservoirs.

The permeate and/or waste streams of several filtration units can be collected together. To this end, permeate and/or waste stream channels of several filtration units lead to a common tank, or the permeate and/or waste stream channels are connected with each other. In particular, the permeate and/or waste stream channel of at least one filtration unit can be connected with a common input port of at least one further filtration unit, especially for continuous processing or multi stage separation.

For a more sophisticated control and/or evaluation of the filtration processes the filtration modules may include at least one sensor for measuring at least one of the following parameters: feed pressure, retentate pressure, permeate pressure temperature, pH, conductivity, viscosity, flow, permeate pressure, protein concentration, turbidity.

According to a major aspect of the invention, each filtration unit is configured to receive a filter cassette, preferably a single use filter cassette including one or a plurality of membrane filters. The use of a new filter cassette for each experiment makes it possible to provide the same preconditions for each experiment. Thus, the quality of the experiment results is not affected by an unpredictable condition of an already used filter cassette (filter cake residue, clogged membrane pores etc.). Another advantage of the single use filter cassettes is a simplified cleaning process. After completion of an experiment only the other hardware components of the filtration units without the filter cassette have to be cleaned. This results in a longer lifetime of the sensors because in total less cleaning is needed since no protein has to be removed from the filters, which means less interaction of the sensors and other sensitive components with cleaning fluid.

In a preferred embodiment of the invention each filter cassette is held in a filter cassette holder and received together with the filter cassette holder in a matching receptacle of the respective filtration unit. The filter cassette holder may interact with the receptacle to provide a comfortable snap-in connection or the like.

According to another advantageous aspect of the invention, each filter cassette bears machine readable information on it, preferably including at least one of the following: batch number, type and specifics of the filter membrane(s), date of manufacture, use-by date, maximum operating pressure, link to further information (e.g. web manual etc.). The information can be contained in a barcode, QR code, RFID tag or the like. With a suitable reading device (scanner etc.) the information can be easily read and submitted to the central control unit of the filtration system for further processing. In addition, the software may have a database of additional operating characteristics keyed to the machine readable information. The information held on the barcode, QR code, RFID tag or the like can also be digitally signed to authenticate the manufacturer of the device. The system can enforce that only authenticated cassettes may be used.

In the central control unit the filter cassette can be associated with the filtration unit where it is inserted easily and without much user interaction. To this end, at least some, preferably all, of the filtration units are provided with machine readable information, preferably including unit ID codes. Scanning one of the unit ID codes would indicate to the control software that the respective filtration unit should be selected. A subsequently scanned filter cassette (identifier contained in the machine readable information) can then be automatically loaded into the selected location. At other times, upon selection, detailed information and/or graphs about the selected filtration unit and/or filter cassette could be shown on the user interface.

Apart from a control software for controlling the filtration processes running in the individual filtration units, the central control unit may also include a user interface for ease of operation, especially for assisting a user in setting up desired experiments and viewing data both during and after the run.

Setting up experiments with the filtration system can be accelerated by the possibility of accessing pre-defined setups via the user interface. Such pre-defined setups could be suggestions by the manufacturer of the filtration system or previously used setups stored by the user.

The software controlling the system is available to the user either via a fixed interface on the filtration system or, alternatively, on a mobile device like a tablet or laptop computer for the control of the run of the experiments. Additionally, aspects of the software enabling the design of experimental runs, simulation of those runs and analysis as well as presentation of data generated in runs may be available in multiple instances on other devices.

The invention also provides a method of using an automated modular filtration system as described above for performing a plurality of filtration processes at the same time. The method according to the invention comprises the step of loading a filter cassette, preferably a single use filter cassette, into each filtration unit. As already mentioned, the use of a new filter cassette for each experiment makes it possible to provide the same preconditions for each experiment. Thus, the quality of the experiment results is not affected by an unpredictable condition of an already used filter cassette (filter cake residue, clogged membrane pores etc.). Another advantage of the single use filter cassettes is a simplified cleaning process. After completion of an experiment only the other hardware components of the filtration units without the filter cassette have to be cleaned. This results in a longer lifetime of the sensors because in total less cleaning is needed since no protein has to be removed from the filters, which means less interaction of the sensors and other sensitive components with cleaning fluid.

According to an advantageous aspect of the invention, the method further comprises the following steps: performing a flux test; measuring a flux value for each filter cassette; and comparing the measured flux value with a flux value specified by the manufacturer of the filter cassette or an expected flux value. The comparison reveals any deviations. Major deviations either indicate that the filter cassette or one of the fluid connections is damaged or that a wrong type of filter cassette was inserted. Minor deviations may be (automatically) considered by the central control unit in controlling the experiment and/or in the evaluation of the experiment. Additionally, such data may be utilised for other processes, including but not limited to assessment of manufacturing and delivery process, materials of manufacture, manufacturing environment for purposes including optimisation, validation and scheduling.

Before or after the flux test, a sanitization process may be performed.

If a filter cassette (or its package or a document related to the filter cassette) contains machine-readable information about the filter cassette, this information can be easily read by a suitable device and be submitted to the control software of the central control unit. The machine-readable information preferably includes at least one of the following: batch number, type and specifics of the filter membrane(s), date of manufacture, use-by date, maximum operating pressure, link to further information (e.g. web manual etc.).

According to an aspect of the invention, a user is prompted to provide the machine readable information of a filter cassette which is to be used in a specific filtration unit to the control software of the central control unit.

Further, machine-readable information about at least one filtration unit can be submitted to the control software of the central control unit. The machine-readable information preferably includes a unit ID code.

The submitted information may be used by the control software for at least one of the following: associating a filter cassette to a filtration unit; providing appropriate setups based on the loaded filter cassettes; emitting a warning if a wrong or inappropriate filter cassette is loaded; emitting a warning if a filter cassette is reused; considering the information in controlling and/or in the evaluation of the experiments.

When the setup of all experiments is completed, all the filtration processes in the filtration units can be started at the same time.

The cleaning of the hardware components that come into contact with the fluids during an experiment can be significantly simplified in that after completion of the filtration processes the filter cassettes are removed from the filtration units and fluid connections are automatically or semi-automatically established to bridge the spaces of the removed filter cassettes. This is a unique feature that makes it unnecessary to establish additional fluid connections when a filter cassette is removed (otherwise the cleaning fluid would escape the filtration unit). In this connection, "automatically" means that the fluid connections are established by means that are automatically activated when the filter cassettes are removed, while "semi-automatically" means that after the filter cassettes are removed the fluid connections are automatically established by manually closing filter clamps that held the filter cassette.

Preferably, an automated cleaning process is triggered after removal of the filter cassettes. The automated cleaning process uses at least one of the system fluids supplied via at least one of the second input ports of the filtration modules. The whole cleaning process can be performed in the absence of the user.

The general design of the automated modular filtration system makes it possible to perform experiments in which fluid output from the filtration process of one filtration unit is routed to at least an input of a filtration process in another filtration unit.

The invention further provides a method of performing a plurality of filtration processes at the same time, using an automated modular filtration system as described above. The method according to the invention comprises the steps of:

executing filtration processes in the individual filtration units independent of the respective other individual filtration units of the filtration system; providing a first type of fluids to the first input ports of the filtration modules, the fluids of the first type being process fluids specific to the respective filtration processes executed in the individual filtration units; providing a second type of fluids to the second input ports of the filtration modules, the fluids of the second type being system fluids not specific to the respective filtration processes executed in the individual filtration units; forwarding the system fluids from one filtration module to an adjacent filtration module of the filtration system via inter-module connections established by the second input and exit ports; outputting unused system fluids through the exit ports of the filtration modules; and jointly controlling the filtration processes executed in the individual filtration units by at least one control unit.

According to an advantageous aspect of the invention, a distributed control architecture is used for controlling the filtration processes executed in the individual filtration units, the distributed control architecture including dedicated local unit controllers, distinct from the control unit, in each individual functional filtration unit.

Further features and advantages of the invention will become apparent from the following description and from the accompanying drawings to which reference is made. In the drawings:

DETAILED DESCRIPTION OF THE INVENTION

The following description relates to preferred embodiments of a modular tangential flow filtration system according to the invention. However, the invention is not limited to these embodiments. A person skilled in the art will understand that certain features are optional or may be replaced by other appropriate features.

Figure 1:
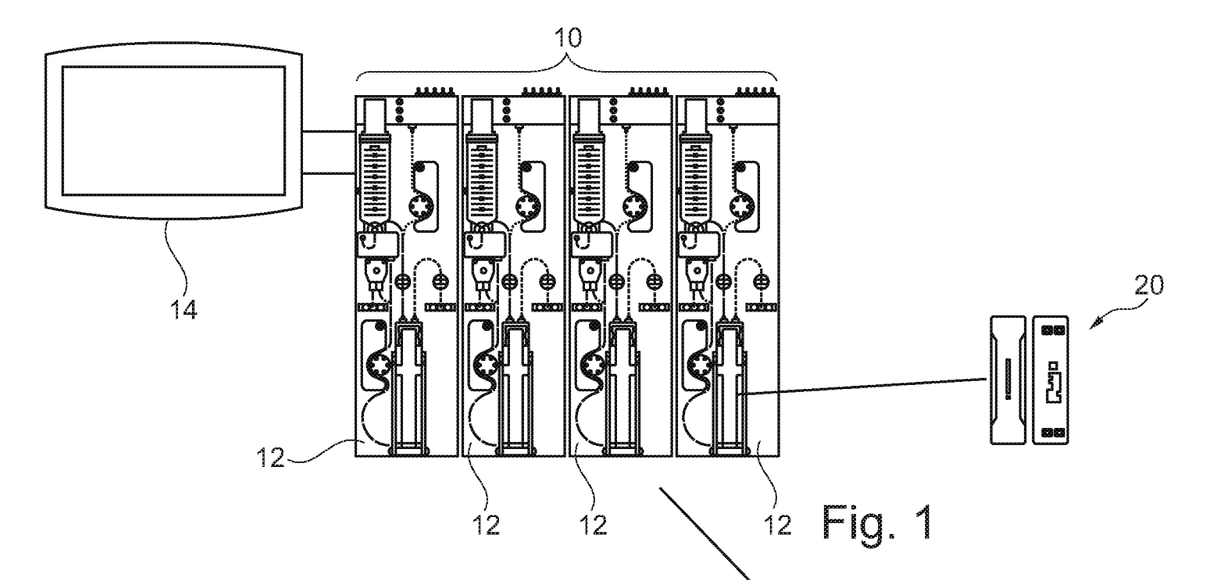
FIG. 1 shows the basic components of an embodiment of the modular filtration system according to the invention.
Figure 2:
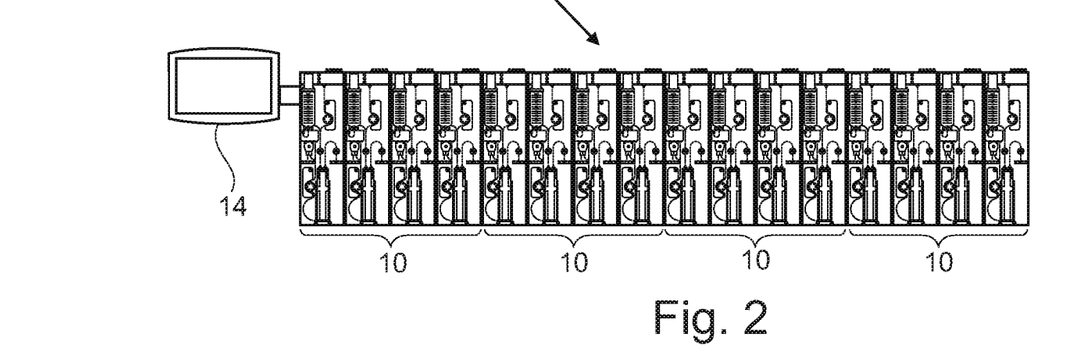
FIG. 2 shows a specific arrangement of an embodiment of the modular filtration system according to the invention.

FIG. 1 is a schematic representation of a filtration module 10 including a number of individual filtration units 12, in particular tangential flow filtration (TFF) units. Each filtration unit 12 is part of a fully self-contained tangential flow system designed particularly to carry out ultrafiltration or diafiltration processes. Although four is a preferred number, the filtration module 10 may include more or less than four filtration units 12 as one set. Each set of filtration units 12 forms a filtration module 10, i.e. a pre-assembled structure, which is used as the smallest common physical unit for configuring a filtration system according to the specific needs of a customer. In FIG. 2 an example configuration is shown with four filtration modules 10, each including four filtration units 12, resulting in a total of 16 individual filtration units 12.

Each filtration unit 12 is controlled by a central control unit 14 which is connected to the array of filtration modules 10. The main software of the central control unit 14 may be hosted by a stationary computer associated to the filtration system. It is also possible to have multiple control units for controlling the filtration processes in the filtration modules 10 of the system. In this case, independent filtration units 12 within the system are assigned to different control units as required, as such forming a fixed system resource that can be used flexibly by different operators.

In particular, the modular filtration system features a distributed control architecture where each individual functional filtration unit 12—out of e.g. four within a single filtration module 10—incorporates a dedicated local unit controller (not shown), distinct from the central control unit 14. This ensures that each single functional filtration unit 12 is independent except for power supply and a common data bus for communications. The common data bus is terminated by the central control unit 14 that runs the process recipes and issues commands to change operational mode and set control parameters (target pressure, flow rate, liquid addition volumes, sampling volumes, etc.). Between such instructions from the central control unit 14 the individual device operations are managed by the local controller. The central control unit 14 would normally be a PC executing the high level system software. However, it is not limited to a PC, it can be any device with sufficient capabilities to issue commands to distributed controllers according to a defined recipe process.

Because of this architecture each individual filtration unit 12 features a very high degree of autonomy. Failure of the central control unit 14 does not prevent the modular filtration system from continuing its operation until central controller functionality is restored. This robustness is critical as one example embodiment may have four filtration modules 10, each comprising four individual filtration units 12 connected to the central control unit 14, thus a total of 16 individual filtration units 12 and 16 experiments underway. The investment in preparation time and test samples in such experiments means that robustness of operations is essential for the utility of the systems; it increases the certainty of retaining valuable samples which are derived from costly bioreactor run and also ensure development timelines can be met and the use of the system continues to give the right balance between risk and gain.

In addition, this control architecture enables process customization and control, by the operator, using the graphical user interface of the central control unit 14. The operator can rerun a previously performed process recipe or design a new one, either from scratch or by modifying a previously defined one. Using the filtration system software, the user can design or modify the recipe for a process by composing it from recipe steps and also by changing the parameters of these recipe steps. The recipe steps are taken from a fixed toolbox of permitted recipe steps.

Each recipe step makes an operational change to the local unit controller on an individual filtration unit 12; such as providing an instruction, e. g for the change of a set point or to add/remove liquid; or performing process flow control, e. g. a delay, a branch, a repeat or a condition; or prompting the user to perform a manual action, e. g. change an item of disposable labware.

This control architecture enables approaches such that the operator has complete control in customizing the process performed, within the operation limits of the system. Additionally, the recipe for the process can be customised individually for each individual filtration unit 12, both in terms of which steps run, and the values (set points etc.) used.

The setup of the individual filtration units 12 is substantially identical, including several input and exit ports. A diagram representing an individual UF/DF filtration unit 12 is provided in FIG. 3. The input ports include first ports 16 for a first type of fluids, hereafter referred to as "process fluids". The process fluids are specific to the filtration process executed in the respective filtration unit 12 and may include protein solutions (feeds), buffer solutions, etc. The input ports further include second ports 18 for a second type of fluids, hereafter referred to as "system fluids". The system fluids are not specific to the filtration process executed in the respective filtration unit 12 and may provide pH calibration, other calibration and/or automated cleaning.

Figure 3:
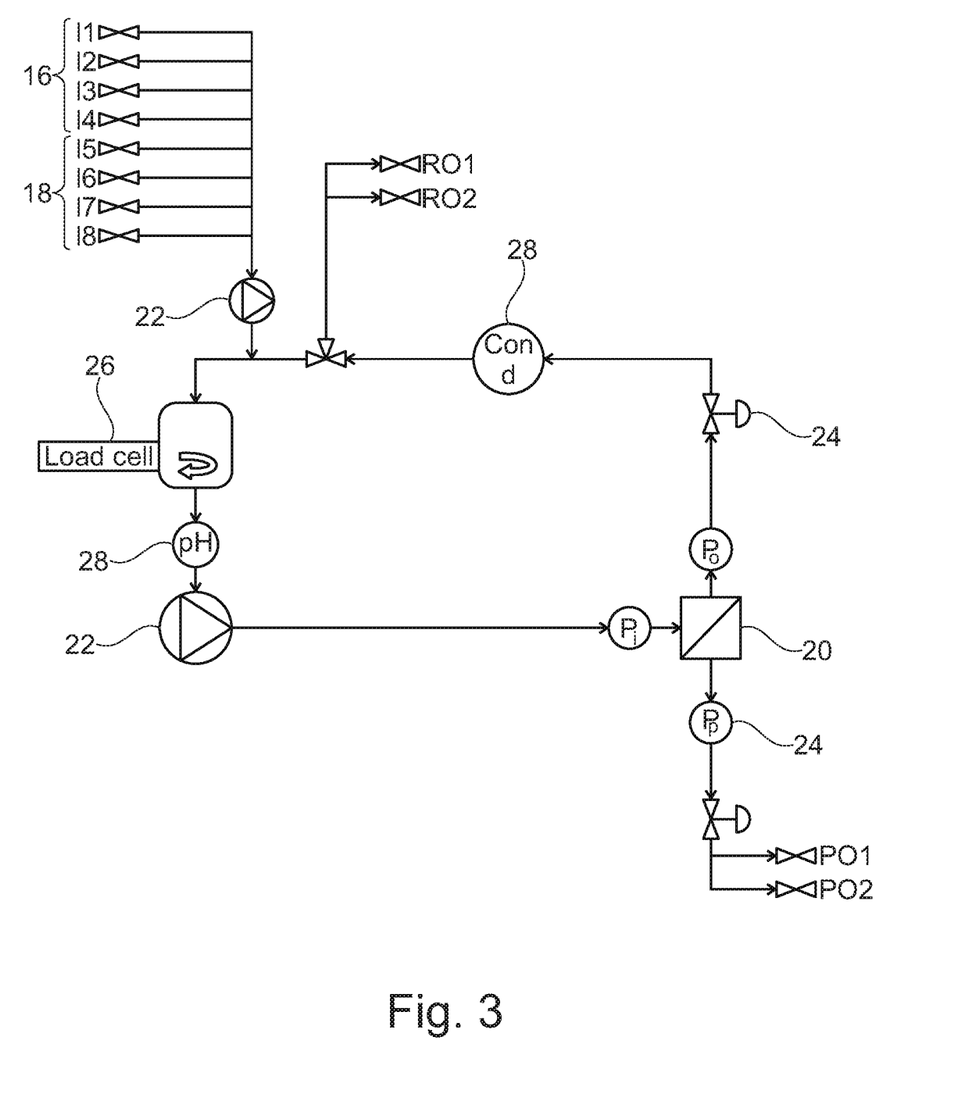
FIG. 3 shows a fluid diagram of an embodiment of a filtration unit of a filtration module of the modular filtration system according to the invention.

The actual filtration is performed in each filtration unit 12 by one or more single use membrane filters arranged in a filter cassette 20. The setup of the filter cassette 20 and loading of a filter cassette 20 into a filtration unit 12 will be explained further below. The filtration unit 12 further includes well-known components like peristaltic pumps 22, valves 24, and a load cell 26. A range of sensors 28 may be employed for measuring one or more of the following parameters: feed pressure, retentate pressure, temperature, pH, conductivity, viscosity, flow, permeate pressure, protein concentration, turbidity.

Figure 4:
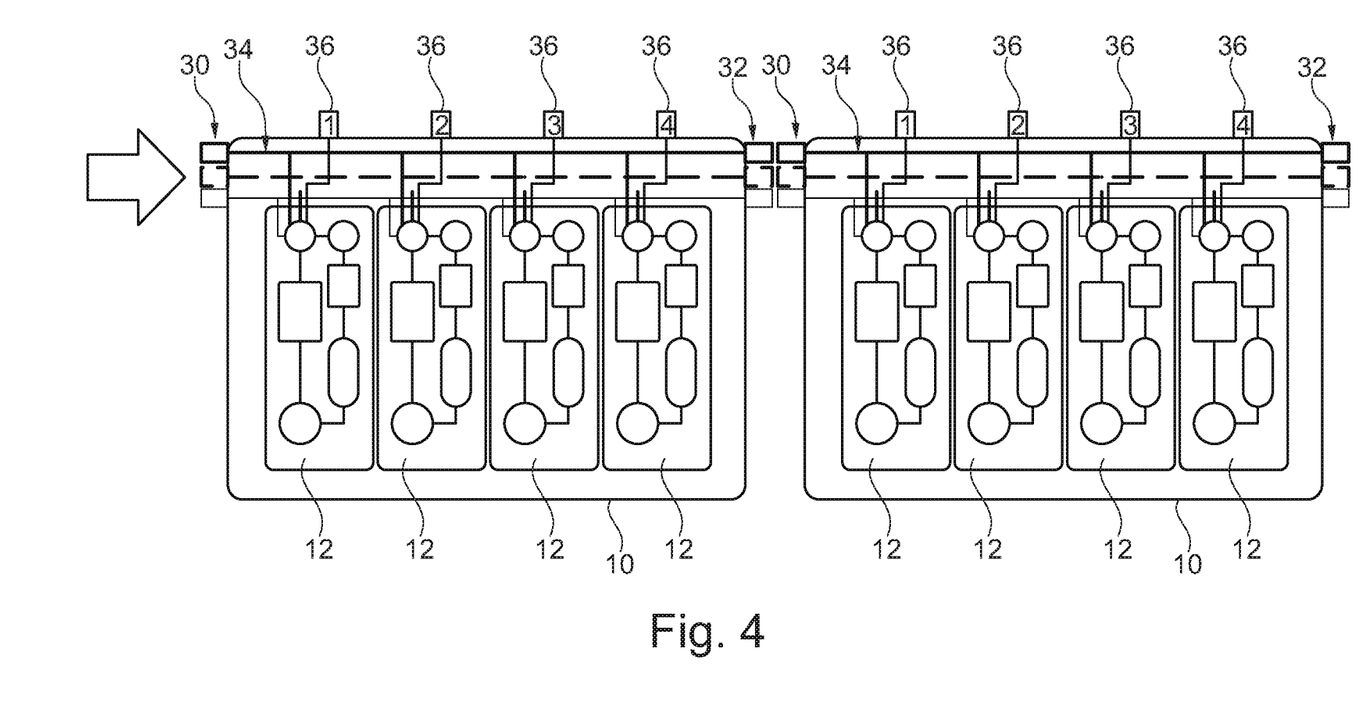
FIG. 4 shows the system fluid path of two connected filtration modules of an embodiment of the modular filtration system according to the invention.

As can be seen in FIG. 4, which shows two filtration modules 10 connected to a modular filtration system, each filtration module 10 includes a set of system fluid input ports 30 and a corresponding set of system fluid exit ports 32. The lines 34 leading from the system fluid input ports 30 to the system fluid exit ports 32 (not shown in FIG. 3) branch off to the individual filtration units 12 so that the system fluids are supplied to each filtration unit 12 of the filtration module 10. The system fluid exit ports 32 of the first filtration module 10a are connected (via tubing or directly) to the system fluid input ports 30 of the second filtration module 10b. Further, each individual filtration unit 12 of the filtration modules 10 has a process fluid input line 36 which is accessible via a connector. In FIG. 4 the input lines 36 are labelled 1, 2, 3, 4, according to the respective filtration unit 12a, 12b, 12c, 12d of the filtration module 10.

The fluid input ports 30 may be connections at a tee or manifold or other tubing connection located at or upstream of a filtration unit 12. Similarly, the exit ports 32 may also be connections at a tee or manifold or other tubing connection located at or downstream of a filtration unit 12. If the respective filtration module 10 is the last module in the fluid supply path then the last filtration unit 12 in that module may not have exit ports to avoid a tubing dead leg.

Figure 5:
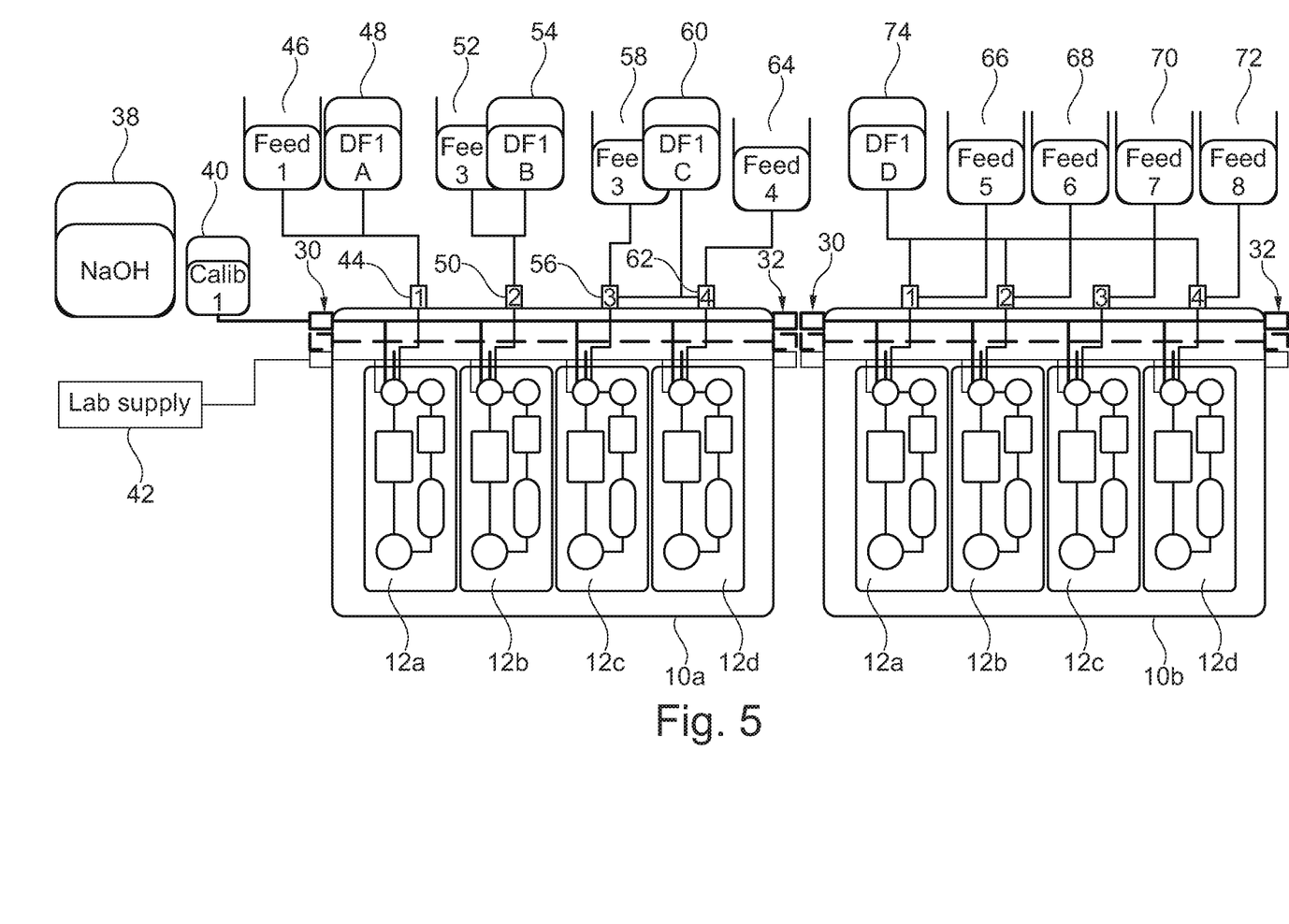
FIG. 5 shows an example of a possible input connection scheme for process fluids of the arrangement of the modular filtration system of FIG. 4.

FIG. 5 shows a possible input connection scheme of the arrangement of the two filtration modules 10. The system fluid input ports 30 of the first filtration module 10a are connected to an NaOH reservoir 38, a buffer solution reservoir 40 for calibration and a lab supply reservoir 42, which may contain a cleaning fluid, for example. These system fluids are provided to the second filtration module 10b via the connections between the system fluid exit ports 32 of the first filtration module 10a and the system fluid input ports 30 of the second filtration module 10b. More filtration modules 10 could be supplied with the system fluids in the same manner.

In the example configuration of FIG. 5 the input line 44 of the first filtration unit 12a of the first filtration module 10a is connected to both a first protein solution reservoir 46 ("Feed 1") and reservoir 48 of a first variant of a first diafiltration buffer solution ("DF1 A"). The input line 50 of the second filtration unit 12b of the first filtration module 10a is connected to both a second protein solution reservoir 52 ("Feed 2") and a reservoir 54 of a second variant of the first diafiltration buffer solution ("DF1 B"). The input line 56 of the third filtration unit 12c of the first filtration module 10a is connected to both a third protein solution reservoir 58 ("Feed 3") and a reservoir 60 of a third variant of the first diafiltration buffer solution ("DF1 C"). The input line 62 of the fourth filtration unit 12d of the first filtration module 10a is connected to both a fourth protein solution reservoir 64 ("Feed 4") and to the reservoir 60 of the third variant of the first diafiltration buffer solution ("DF1 C"). It is to be noted that one DF1C reservoir supplies both the third filtration unit 12c and the fourth filtration unit 12d of the first filtration module 10a at the same time.

In the second filtration module 10b of the example configuration shown in FIG. 5 the four filtration units 12a, 12b, 12c, 12d are connected to fifth, sixth, seventh and eighth protein solution reservoirs 66, 68, 70, 72 ("Feed 5", "Feed 6", "Feed 7", "Feed 8"), respectively, while the buffer solution of a single reservoir 74, namely a fourth variant of the first diafiltration buffer solution ("DF1 D"), is fed to all four filtration units 12a, 12b, 12c, 12d at the same time.

It is readily apparent that other combinations of individual and/or shared supplies of certain solutions to the filtration units 12 are possible. The reservoirs may be flexible bags or other suitable containers which can preferably store enough solution for all the experiments executed in the whole filtration system which require the respective solution, so that the reservoirs do not have to be exchanged during running experiments.

Figure 6:
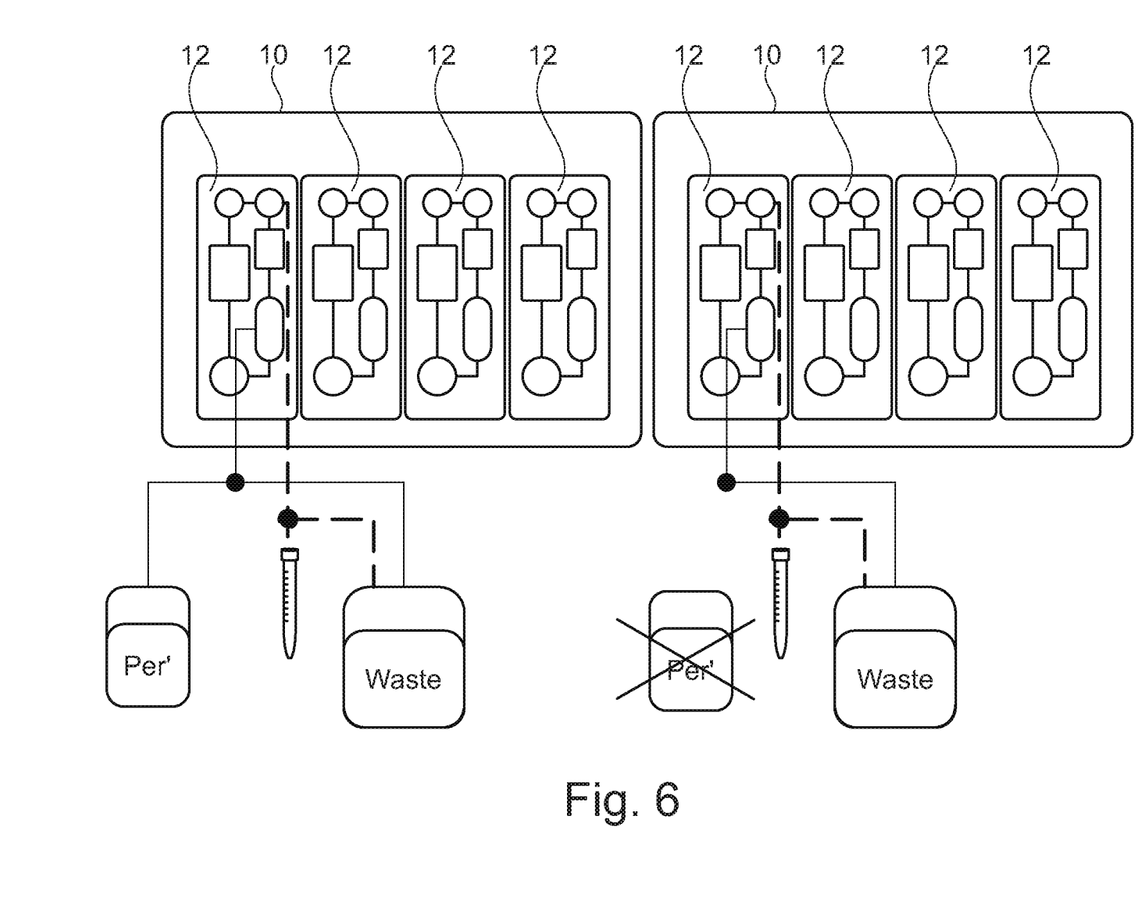
FIG. 6 shows an example of a possible output connection scheme for harvested retentate material, samples of retentate fluid, permeate fluid and waste of the arrangement of the modular filtration system of FIG. 4.
Figure 7:
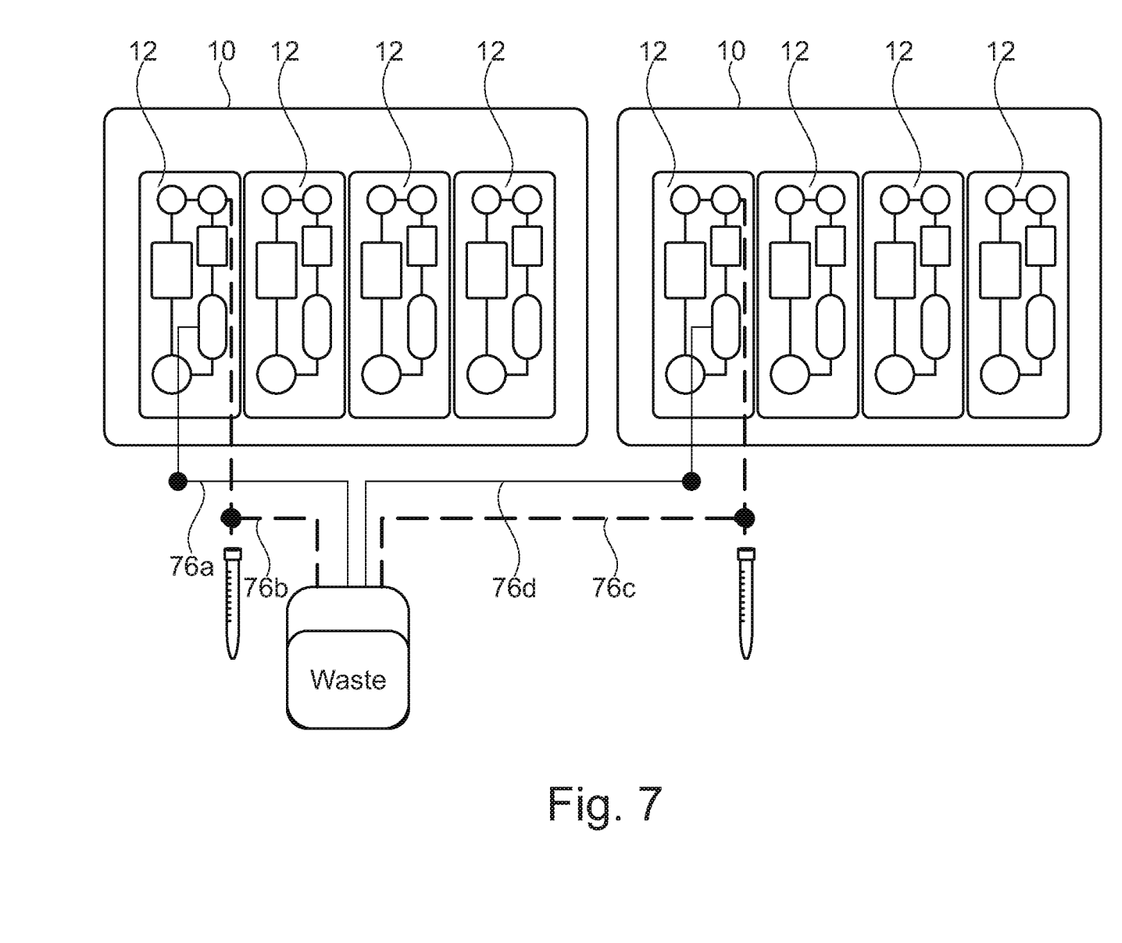
FIG. 7 shows a variant of the scheme for harvested retentate material, samples of retentate fluid, permeate fluid and waste stream collection of the arrangement of the modular filtration system of FIG. 4.

Similar to the variable input connection scheme the output connection scheme of the filtration system is also variable. FIGS. 6 and 7 show two different variants of individually and/or jointly collecting the permeate and/or waste streams of the filtration units 12. Respective channels 76 of the filtration units 12 lead into a common tank 77, or they are connected with each other.

The central control unit 14 includes a control software and a user interface for assisting the user in setting up the desired experiments. The user may also access a library of pre-defined setups or load pre-defined setups from other sources. According to the chosen setups, the user is instructed how to connect the ports of the filtration modules 10 to the system fluids and process fluids reservoirs. If possible, the user interface suggests that certain process reservoirs are used for more than one experiment as described above. The user may set further parameters like temperature, etc. via the user interface. The user interface may be installed on a mobile device like a tablet or a laptop computer to facilitate the setup procedure for the user.

Before the experiments are started, a flux test is performed (while an optional sanitation may be performed before or after the flux test). The membranes of the filter cassettes 20 of each filtration unit 12 are flushed with water, and the normalised water permeability (NWP) of the membranes is measured to obtain flux and pressure baselines. The filtrate flux is the rate the liquid passes through the filter membranes, and may also be called the permeate flow rate. Therefore, the NWP is the amount of water that will flow through the membranes at a specific driving force (TMP). It is to be noted that the water flux test is not performed because the membranes may not have been cleaned appropriately (with pores being still partially clogged). Rather, for each experiment a new single use filter cassette 20 is employed which may be pre-sterilised, e.g. by chemicals, gamma-irradiation, gas or autoclaving. (It is also possible that the whole filtration unit 12 and even the whole filtration unit flow path including tubing etc. is pre-sterilised). The measured pre-use flux value is used to compare with the value specified by the manufacturer to determine any deviations. The deviations may indicate a damage or be (automatically) considered in controlling the experiment and in the evaluation of the experiment, depending on the magnitude of the deviations.

In operation, all processes are started at the same time, so that the different processes in the individual filtration units 12 all run simultaneously. Thus, it is possible to effectively perform a number of related experiments, for example running the same protein solution (feed) against different diafiltration buffer solutions, or running different protein solutions against the same buffer solution, or combinations thereof.

It is preferable to control the temperature between the filtration modules 10 of the system to allow exploration of different operating temperatures and to avoid variation in the experiments executed over a period of time—temperature being known to have significant effects on protein stability, degradation, viscosity etc. The temperature is controlled by the central control unit 14 with the aid of temperature sensors and appropriate heating/cooling means.

After the product collection (harvest) is completed, the samples and the filter cassettes 20 are removed by the user. A fluid connection is automatically, semi-automatically or manually established to bridge the space of each removed filter cassette 20. By simply pressing a button an automated cleaning process is started. For performing the cleaning process no user interaction is necessary. The automated cleaning process uses one or more cleaning fluids supplied via the system fluid input ports 30 of the filtration modules 10. After the cleaning process and insertion of new filter cassettes 20 the filtration units 12 are ready for the next set of experiments.

The control software also evaluates the results of the experiments and displays the information of the analysis on the mobile device and/or on the stationary computer associated to the filtration system.

As indicated before, each filtration unit 12 is configured to receive a single use filter cassette 20 including one or a plurality of membrane filters, membrane filter layers or membrane filter stacks. Each filter cassette 20 is used for only one filtering process. The user may choose between a number of different filter cassette types with different filter properties such as membrane pore size, material of the membranes, flow channel design, spacer, etc. However, the filter cassettes 20 all have the same outer profile characteristics so that each type of filter cassette 20 matches a given filter cassette holder of the filtration units 12.

Each filter cassette 20 bears information on it, preferably contained in a barcode, RFID tag or the like. The information may include one or more of the following: batch number, type and specifics of the filter membranes, date of manufacture, use-by date, maximum operating pressure, link to further information (e.g. web manual etc.). With an appropriate reading device the user is able to submit the relevant information to the control software of the central control unit 14. The control software may use the information for one or more of the following: providing appropriate setups based on the loaded filter cassettes 20; emitting a warning if a wrong or inappropriate filter cassette 20 is loaded; emitting a warning if a filter cassette 20 is reused; considering the information in controlling the experiments and/or in the evaluation of the experiments.

Figure 8:
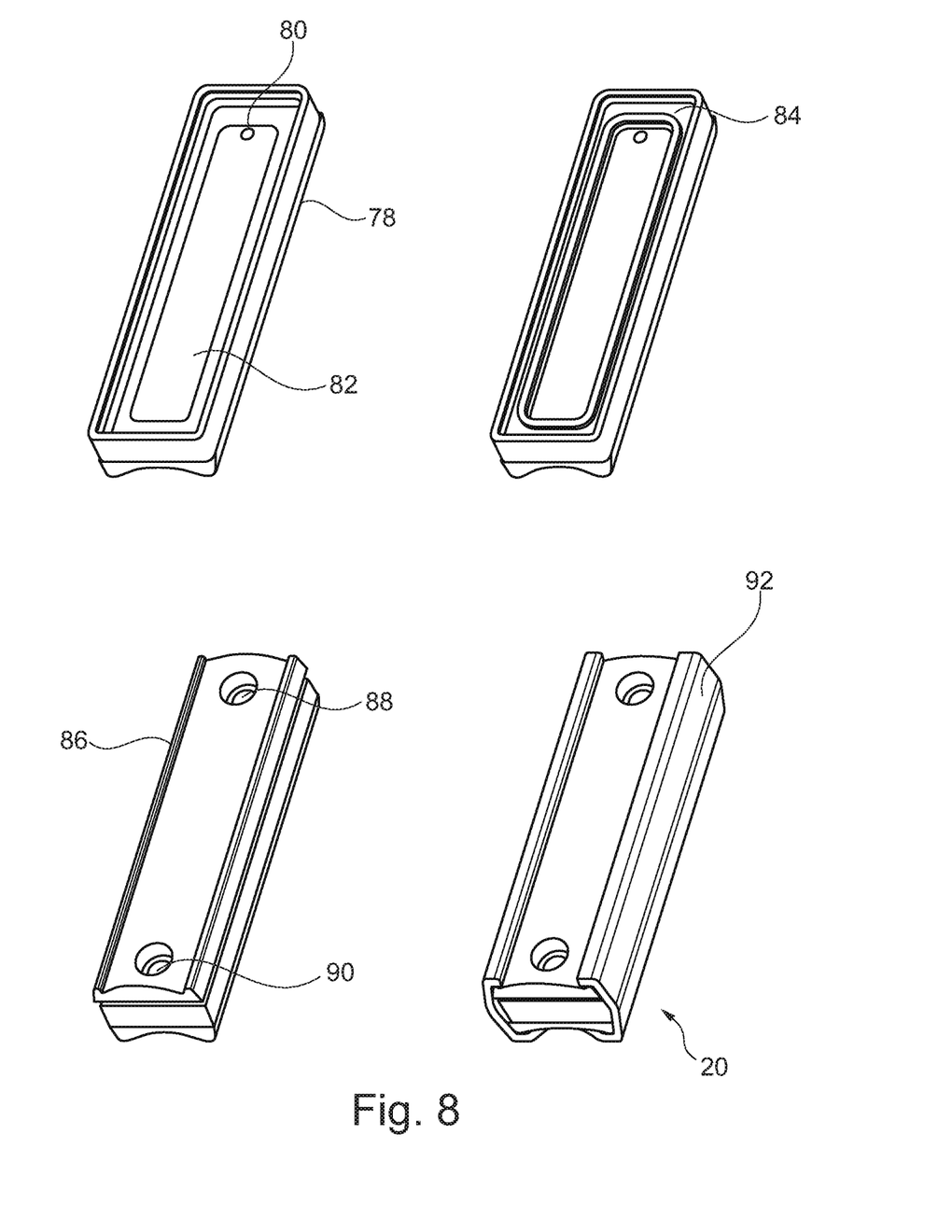
FIG. 8 shows one of a number of possible assembly sequences of a filter cassette according to a first embodiment.
Figure 9:
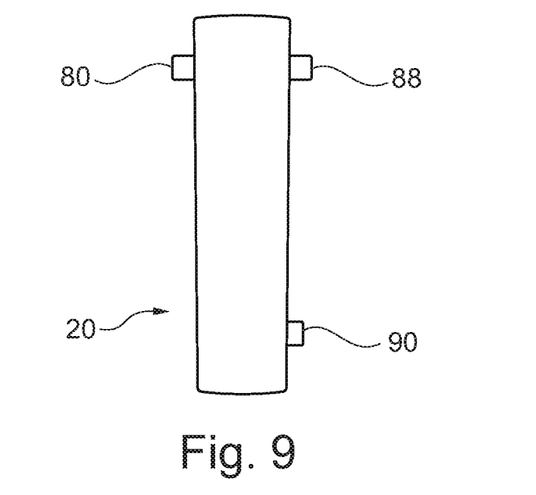
FIG. 9 shows a filter cassette according to the first embodiment in an upright position.

Possible structures for the filter cassettes 20 are illustrated in FIGS. 8 to 12. In particular, FIG. 8 shows the assembly sequence of a filter cassette 20 according to a first embodiment. In this embodiment a bottom plate 78 includes a permeate outlet channel 80. A supporting structure 82 (e.g. mesh) can be placed into the permeate outlet channel (port) 80 or be part of the inner surface of the bottom plate 78. A sealing structure 84 (e.g. gasket) and a membrane (not shown) are placed on the bottom plate 78. The membrane can be placed between two sealing structures 84, or only a one-sided sealing 84 or no additional structure is provided. A top plate 86 with feed and retentate ports 88, 90 is added. The inner surface of the top plate 86 consists of a spacer structure or a slot to place a spacer (e.g. mesh). A clamping structure 92 is provided for compression and sealing of the filter cassette 20. In FIG. 9 the three ports 80, 88, 90 of the filter cassette 20 can be seen. The permeate port 80 extends from the bottom plate 78, whereas the retentate and feed ports 88, 90 extend from the opposite top plate 86. All ports 80, 88, 90 feature Luer lock connections, although other connection types may be used as well, preferably low volume connection types, e.g. types in which the connection is only sealed by a sealing ring.

Figure 10:
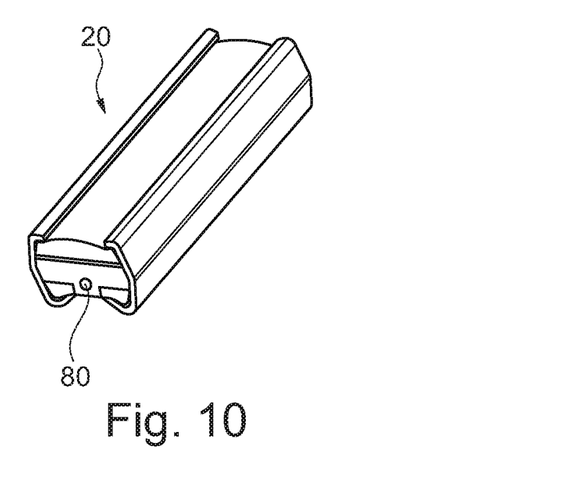
FIG. 10 shows a filter cassette according to a second embodiment.

FIG. 10 shows a second embodiment with a permeate outlet 80 provided at one of the sides of the filter cassette 20.

Figure 11:
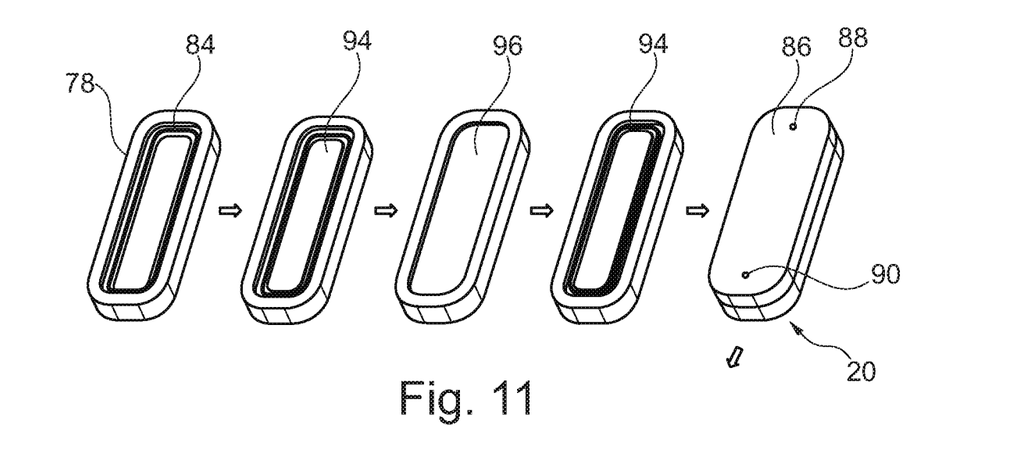
FIG. 11 shows an assembly sequence of a filter cassette according to a third embodiment.
Figure 11A:
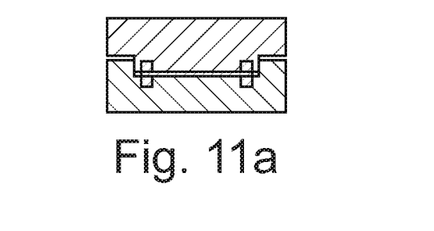
FIG. 11a shows a detail of a cross section of the assembled filter cassette of FIG. 11.

In FIG. 11 the assembly sequence of a filter cassette 20 according to a third embodiment is shown. A bottom plate 78 with a sealing 84 is provided. A spacer 94 and a frame (optional) for protecting the membrane 96 are placed on the bottom plate 78 before the membrane 96 is inserted. A further spacer 94 and a further sealing 84 are placed on top of the membrane 96 before the filter cassette 20 is closed with a top plate 86 including all ports, i.e. the permeate, retentate and feed ports 80, 88, 90. Thus, in contrast to the first and second embodiments, here all the ports 80, 88, 90 are provided on the same side of the filter cassette 20. In the cross-sectional view of FIG. 11a the sealing of the membrane 96 can be seen in detail.

Figure 12:
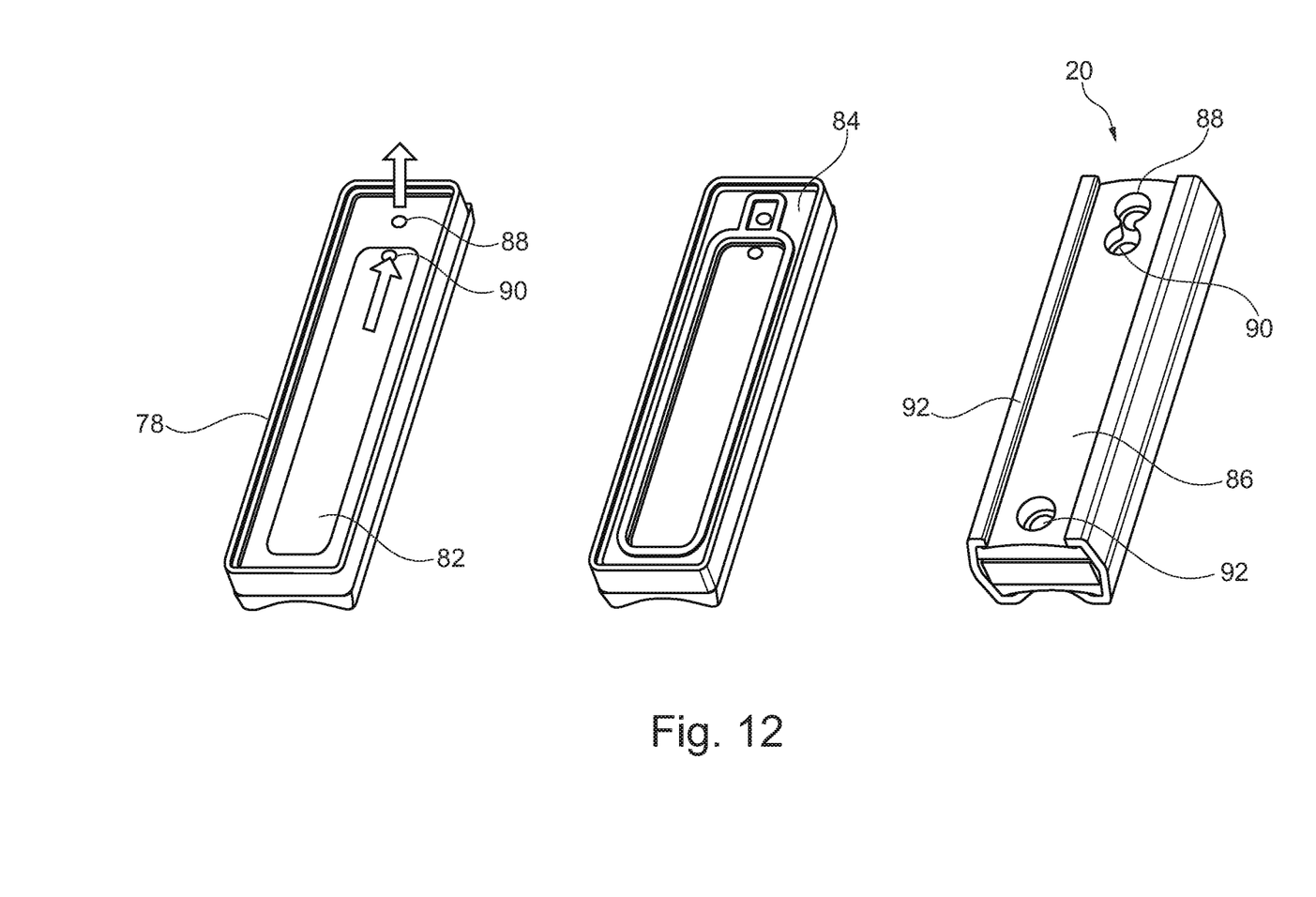
FIG. 12 shows an assembly sequence of a filter cassette according to a fourth embodiment.

FIG. 12 depicts the assembly of a fourth embodiment of the filter cassette 20. Although the structure is very similar to that of the first embodiment, the ports 80, 88, 90 of the filter cassette 20 according to the fourth embodiment are all placed on the top side. This means that all outlet channels (permeate, retentate, feed) are formed in the top plate 86 of the filter cassette 20.

Of course, certain aspects of the embodiments described above may be combined in other ways. Moreover, individual illustrated parts of the construction may also be present as composite parts. Different positioning and a different number of ports 80, 88, 90 are possible.

Each type of filter cassette 20 has shape characteristics matching with corresponding characteristics of a common filter cassette holder. The filter cassette holder, in turn, includes shape characteristics matching with corresponding characteristics of a common filter cassette holder receptacle provided in each filtration unit 12.

The invention claimed is:

1. An automated modular filtration system for tangential flow filtration processes, the automated modular filtration system comprising:
   a plurality of filtration modules formed as separate pre-assembled structures,
      each of the plurality of filtration modules containing at least one individual tangential flow filtration unit configured to receive a filter cassette including one or a plurality of membrane filters to carry out an ultrafiltration process or a diafiltration process,
      each of the at least one individual filtration units of the plurality of filtration modules being designed for executing a filtration process for harvesting target molecules independent of the other at least one individual filtration units of the plurality of filtration modules,
      each of the plurality of filtration modules also including first input ports for receiving a first type of fluids, the fluids of the first type being process fluids which are specific to the respective filtration processes executed in the individual filtration units and include a protein solution and/or a buffer solution,
      each of the plurality of filtration modules also including second input ports for receiving a second type of fluids, the fluids of the second type being system fluids which are not specific to the respective filtration processes executed in the individual filtration units and include at least one of the following: a cleaning fluid, a buffer solution for calibration, water, a storage solution used to maintain physical or chemical integrity of the system during periods of non-use, and
      each of the plurality of filtration modules also including exit ports for outputting unused system fluids,
      the second input ports and the exit ports of each of the plurality of filtration modules being designed for establishing inter-module connections so that the system fluids can be forwarded from one of the plurality of filtration modules to an adjacent one of the plurality of filtration modules of the automated modular filtration system,
   the automated modular filtration system further comprising system fluid lines leading from the second input ports to the exit ports within the plurality of filtration modules, the system fluid lines branching off to the individual filtration units,
   the automated modular filtration system further comprising at least one control unit designed for jointly controlling the filtration processes executed in the individual filtration units.

2. The automated modular filtration system according to claim 1, characterised by a distributed control architecture where each of the at least one individual filtration units of the plurality of filtration modules incorporates a dedicated local unit controller, distinct from the control unit.

3. The automated modular filtration system according to claim 1, characterised in that the second input ports of a first filtration module of the automated modular filtration system are connected to system fluid reservoirs.

4. The automated modular filtration system according to claim 3, characterised in that the system fluid reservoirs include at least one of: a cleaning fluid reservoir, a buffer solution reservoir for calibration, a fluid reservoir for water, a storage solution reservoir with the storage solution being used to maintain physical and chemical integrity of the automated modular filtration system during periods of non-use.

5. The automated modular filtration system according to claim 1, characterised in that at least one process fluid reservoir is connected to the first input ports of several of the at least one individual filtration units via input lines.

6. The automated modular filtration system according to claim 5, characterised in that the process fluid reservoir is a reservoir containing a protein solution or a buffer solution.

7. The automated modular filtration system according to claim 1, characterised in that permeate and/or waste stream channels of several of the at least one individual filtration units of the plurality of filtration modules lead to a common tank, or the permeate and/or waste stream channels are connected with each other, or the permeate and/or waste stream channel of one of the at least one individual filtration units is connected with a common input port of another of the at least one individual filtration units.

8. The automated modular filtration system according to claim 1, characterised in that each of the plurality of filtration modules includes at least one sensor for measuring at least one parameter selected from the group consisting of feed pressure, retentate pressure, permeate pressure, temperature, pH, conductivity, viscosity, flow, permeate pressure, protein concentration, turbidity.

9. The automated modular filtration system according to claim 1, characterised in that the filter cassette is held in a filter cassette holder and received together with the filter cassette holder in a matching receptacle of the respective filtration unit.

10. The automated modular filtration system according to claim 1, characterised in that the filter cassette has machine readable information on it, including at least one of: batch number, type and specifics of the membrane filters, date of manufacture, use-by date, maximum operating pressure, link to further information.

11. The automated modular filtration system according to claim 1, characterised in that at least some of the filtration units are provided with machine readable information, including unit ID codes.

12. The automated modular filtration system according to claim 1 characterised in that at least one control unit is a central control unit comprising control software and a user interface assisting a user in setting up desired experiments.

13. The automated modular filtration system according to claim 12, characterised in that the user interface provides access to pre-defined setups.

14. The automated modular filtration system according to claim 12, characterised in that the user interface is installed on a mobile device.

* * * * *